Aug. 29, 1950 — J. A. CAMPBELL — 2,520,305
CURB INDICATOR SWITCH FOR VEHICLES
Filed Aug. 25, 1947

JULIAN A. CAMPBELL
INVENTOR.

BY *[signature]*
ATTORNEY

Patented Aug. 29, 1950

2,520,305

UNITED STATES PATENT OFFICE 2,520,305

CURB INDICATOR SWITCH FOR VEHICLES

Julian A. Campbell, Long Beach, Calif.

Application August 25, 1947, Serial No. 770,350

8 Claims. (Cl. 200—52)

This invention relates to an improved signaling device designed to indicate movement of a vehicle to a location of predetermined clearance from a curb or other object, the device being particularly adapted for attachment to the fender of an automobile as an aid in parking.

The present device is generally of the type employing mechanism operable by engagement with the curb to close an electric signal circuit. To achieve the maximum simplicity compatible with effective operation, the invention contemplates reducing the essential structure fundamentally to two members; a stationary support and a deflectible member, each carrying an electrical contactor. Movement of the deflectible member, upon engagement with the curb, will then operate to close the circuit and thereby signal the driver.

A further object is to provide a simple means for adjusting the height of the deflectible member relative to the street without movement of the stationary member, and without affecting operativeness of the switch mechanism. Further, it is intended to provide the device with a deformable shield capable of protecting the electrical contacts from weather and foreign matter.

More specifically, the device comprises a curb engaging unit held rigidly behind each right hand fender, and adapted to energize a visual, audible, or other signal electrically operable thereby, as for instance, a light on the dashboard. Each fender unit carries a depending coil spring and an L-shaped feeler, slidable within the spring, extending downwardly and outwardly therefrom. Two electrical contacts are located on the spring and its supporting member in such relative positions as to close the signal circuit upon engagement of the extremity of the feeler with the curb.

The invention will be better understood from the following description of a particular and typical embodiment, as illustrated in the accompanying drawing, in which.

Figure 1:
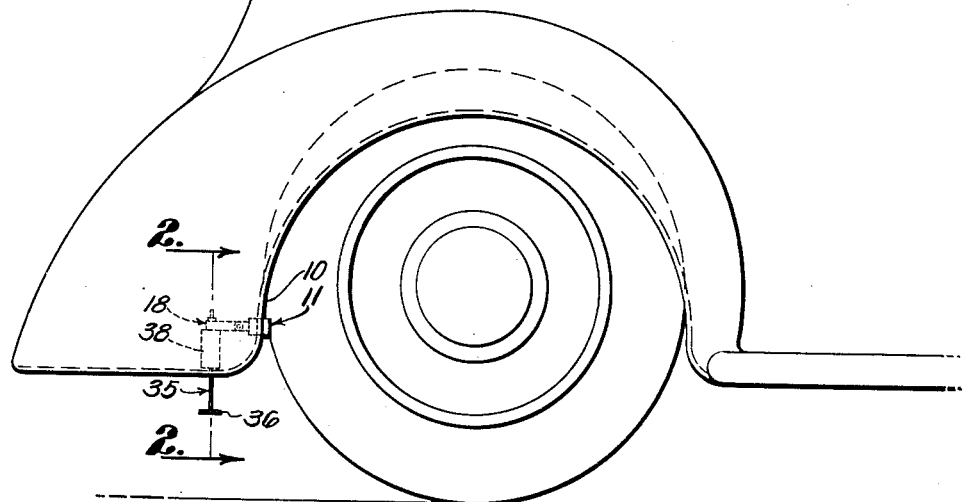
Fig. 1 is a side elevation of the right rear wheel and fender of an automobile with the device attached.
Figures 2, 3, 4:
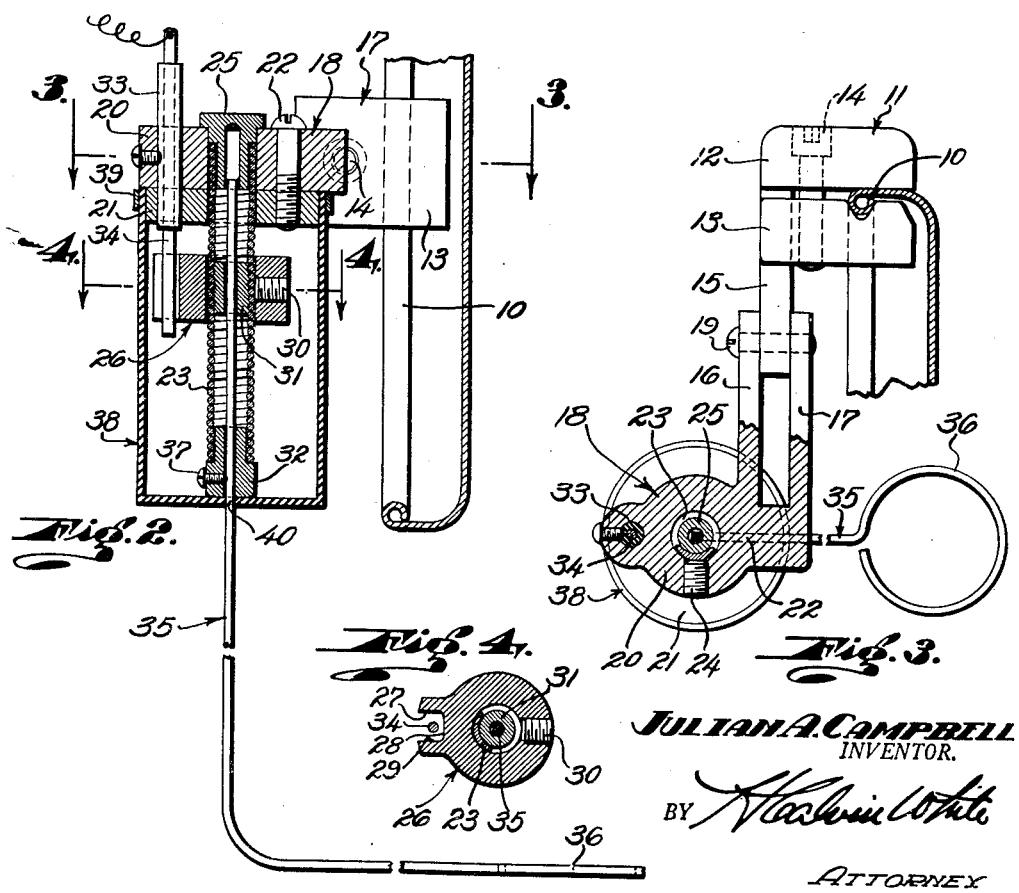
Fig. 2 is an enlarged vertical section taken on line 2—2 of Fig. 1.
Fig. 3 is a horizontal section taken on line 3—3 of Fig. 2.
Fig. 4 is a horizontal section taken on line 4—4 of Fig. 2.

Inasmuch as the curb engaging units are identical, and the signaling circuit may be of any type, only the installation on the right rear fender will be described herein. Referring first to Fig. 3, the stationary member or support, is illustrated in this typical embodiment as comprising a clamp 11 and a body member 18. Attachment to fender edge 10 is effectuated by means of the clamp, jaws 12 and 13 of which are drawn together by bolt 14. Arm 15, projecting from jaw 12, is pivotally connected to spaced arms 16 and 17 of the body by screw bolt 19, which may be tightened to rigidly set the pivotal joint at any desired angle. Thus, regardless of the angle at which fender edge 10 rises, the device may be positioned correctly by adjusting the pivotal joint between the clamp and body. Body 18 may be formed as a single piece, or as two members 20 and 21, connected as by screw 22.

Depending coil spring 23 is held rigidly in an opening in body 18, as by set screw 24 and plug 25, the primary function of plug 25 in the illustrated means of attachment being to prevent distortion of spring 23 upon tightening of set screw 24. Spring 23 carries an electrical contactor 26, recessed to present three contacting faces 27, 28 and 29, see Fig. 4. This contactor may have any appropriate form for application to the spring, but is illustrated typically as a sleeve attached to the spring by set screw 30, distortion of the spring being prevented by insert 31. Spring 23 carries feeler guide 32 at its lower extremity.

Projecting downwardly through the body 18, and insulated therefrom by non-conductor 33, is a pin type contact 34 which, in the normal position of the device, is midway between the contact faces 27 and 29 and a short distance from face 28, as seen in Fig. 4.

Engagement of the electrical contacts is responsive to movement of a substantially L-shaped curb engaging feeler 35, which is preferably made of spring wire or other similarly resilient material and may be looped at its outer extremity, as at 36. Feeler guide 32, insert 31, and plug 25 have openings within which the vertical arm of feeler 35 is slidably receivable. Means, such as set screw 37 in guide 32, is provided for rigidly holding the vertical arm of feeler 35 in any desired axial relationship with spring 23. Thus the horizontal arm of the feeler may be set at any desired height relative to the street. Spring 23 and feeler 35 form together a resilient curb engaging unit and are recited as such in the claims.

A cup shaped shield 38, attached to the body as by band 39 and provided with a hole 40 for the passage of feeler 35, protects the device from weather and foreign matter. The shield may be made of rubber or other deformable material to permit deflection corresponding to that of the feeler and spring.

As pointed out above, normally the electrical contacts do not touch, and no current flows in the signal circuit. However, any engagement of loop 36 with a curb or other object, will cause the contacts to close and give the desired signal to the driver. For instance, movement of loop 36 forwardly or rearwardly of the car, will cause rotational movement of the spring 23 and contactor 26, and will thereby close the electrical circuit through contact 34 and face 27 or 29, depending upon the direction of movement. Similarly, transverse movement of loop 36 will operate to close the circuit between contact 34 and face 28. As the automobile is maneuvered to a correct parking distance from the curb, the feeler is disengaged and returned to normal position by reason of its own resiliency and that of spring 23.

I claim:

1. A curb signaling device comprising a support attachable to a vehicle, an elongated curb engaging unit rigidly attached to said support at one location and extending downwardly and then outwardly therefrom, said unit being resilient and free for resisted rotation about a vertically extending axis and for resisted inward swinging movement transversely of said axis, stationary electrical contact means attached to said support, and movable contact means carried by said curb engaging unit for movement therewith, said stationary and movable contact means having opposed surfaces engageable to close a signal circuit upon said rotation of the unit, and said stationary and movable contact means also having opposed surfaces engageable to close the circuit upon said transverse swinging movement of the unit.

2. A curb signaling device comprising a support attachable to a vehicle, an elongated curb engaging unit rigidly attached to said support at one location and extending downwardly and then outwardly therefrom, said unit being resilient and free for resisted rotation about a vertically extending axis and for resisted inward swinging movement transversely of said axis, a first electrical contact attached to said support, and a second contact carried by said curb engaging unit for movement therewith, one of said contacts having a recess and the other contact having a projection received within said recess and normally spaced from the walls thereof, whereby said contacts are engageable to close a signal circuit upon either said rotation or said swinging movement of the unit.

3. A curb signaling device comprising a support attachable to a vehicle, an elongated curb engaging unit rigidly attached to said support at one location and extending downwardly and then outwardly therefrom, said unit being resilient and free for resisted rotation about a vertically extending axis and for resisted inward swinging movement transversely of said axis, a first electrical contact attached to said support, and a second contact carried by said curb engaging unit for movement therewith, one of said contacts having a recess with an inner wall and a pair of opposed side walls and the other contact having a projection received within said recess and normally spaced from each of said walls, whereby said projection is engageable with said side walls respectively to close an electrical signal circuit upon said rotation of the resilient unit in opposite directions and is engageable with the inner wall to close said circuit upon said transverse swinging movement.

4. A curb signaling device comprising a support attachable to a vehicle, an elongated curb engaging unit including a vertically extending torsion coil spring rigidly mounted at one end to said support and a movable feeler member rigidly attached to the other end of said spring and extending downwardly and then outwardly therefrom, said unit being resilient by virtue of said spring and free for resisted rotation about the axis of the spring and for resisted inward swinging movement transversely of said axis, stationary electrical contact means attached to said support, and movable contact means carried by said curb engaging unit for movement therewith, said stationary and movable contact means having opposed surfaces engageable to close a signal circuit upon said rotation of the unit, and said stationary and movable contact means also having opposed surfaces engageable to close the circuit upon said transverse swinging movement of the unit.

5. A curb signaling device comprising a support attachable to a vehicle, a resilient curb engaging unit including a vertically extending torsion coil spring rigidly mounted at its upper end to said support and a movable feeler member rigidly attached to the lower end of the spring and extending downwardly and then outwardly therefrom, said unit being resilient by virtue of the spring for resisted rotation about the axis of the spring in opposite directions from a normal condition, electrical contact means stationarily attached to said support, and additional contact means carried by the curb engaging unit for movement therewith, said stationary and movable contact means having opposed surfaces engageable upon rotation of the unit about said axis in either of said directions to close an electrical signal circuit.

6. A curb signaling device comprising a support attachable to a vehicle, a resilient curb engaging unit including a vertically extending torsion coil spring rigidly mounted at a first location to said support and a movable feeler member rigidly attached to the spring at a location spaced axially thereof from said first location, said feeler extending downwardly and then outwardly from the spring, said unit being resilient by virtue of the spring for resisted rotation about the axis of the spring in opposite directions from a normal condition, electrical contact means stationarily attached to said support, and additional contact means carried by the spring intermediate said locations and spaced from each of said locations axially of the spring, said stationary and movable contact means having opposed surfaces engageable upon rotation of the unit about said axis in either of said directions to close an electrical signal circuit.

7. A curb signaling device comprising a support attachable to a vehicle, a resilient curb engaging unit including a vertically extending torsion coil spring rigidly mounted at its upper end to said support and a movable feeler member rigidly attached to the lower end of the spring and extending downwardly and then outwardly therefrom, said unit being resilient by virtue of the spring for resisted rotation about the axis of the spring in opposite directions from a normal condition, electrical contact means stationarily attached to said support and additional contact means carried by the spring intermediate said ends for movement therewith, one of said contacts having a recess with opposed electrically conductive side walls and the other having a projection extending into said recess and engageable with said walls respectively upon rotation of the feeler about said axis in said opposite directions to close an electrical signal circuit.

8. A curb signaling device comprising a support attachable to a vehicle, a resilient curb engaging unit including a vertically extending torsion coil spring rigidly mounted at a first location to said support and a movable feeler member extending downwardly and then outwardly from said spring, means for releasably attaching said feeler member to said spring at a location spaced axially thereof from said first location and in a plurality of vertically adjusted positions, said unit being resilient by virtue of the spring for resisted rotation about the axis of the spring in opposite directions from a normal condition, electrical contact means stationarily attached to said support, and additional contact means carried by the curb engaging unit for movement therewith, said stationary and movable contact means having opposed surfaces engageable upon rotation of the unit about said axis in either of said directions to close an electrical signal circuit.

JULIAN A. CAMPBELL.

REFERENCES CITED

The following references are of record in the file of this patent:

UNITED STATES PATENTS

| Number | Name | Date |
|---|---|---|
| 1,646,164 | Moscate | Oct. 18, 1927 |
| 1,883,040 | Solve | Oct. 18, 1932 |
| 2,060,771 | Kempf | Nov. 10, 1936 |
| 2,082,835 | Kelly | June 8, 1937 |
| 2,243,497 | Bougie | May 27, 1941 |
| 2,258,334 | Miller | Oct. 7, 1941 |
| 2,259,614 | Chang | Oct. 21, 1941 |
| 2,436,123 | Sines | Feb. 17, 1947 |

FOREIGN PATENTS

| Number | Country | Date |
|---|---|---|
| 603,972 | France | Jan. 15, 1926 |
| 634,972 | France | Dec. 10, 1927 |
| 849,538 | France | Aug. 21, 1939 |